April 21, 1964     F. R. ANDERSON     3,129,772
HOEING MACHINE

Filed Nov. 16, 1960     2 Sheets-Sheet 1

INVENTOR.
Frank R. Anderson
BY Ralph Hammar
Attorney

INVENTOR.
Frank R Anderson
BY
Ralph Hannay
Attorney 3,129,772
HOEING MACHINE
Frank R. Anderson, % The Richard Co.,
Baldwin St. Extension, Meadville, Pa.
Filed Nov. 16, 1960, Ser. No. 69,663
5 Claims. (Cl. 172—42)

This invention is a power operated machine for hoeing. The hoeing blades rotate on a vertical axis with horizontal cutting edges which enter the soil and cut the roots of the weeds in the same manner as a hoe. The depth of penetration of the cutting edges is adjustable and in a preferred form there is a depth gage which keeps the blades from digging too deep into the soil. The machine is supported on two wheels, only one of which is driven and the cutting blades are offset to one side of the drive wheel so that it is possible to hoe close to shrubs and plants.

Figure 1:
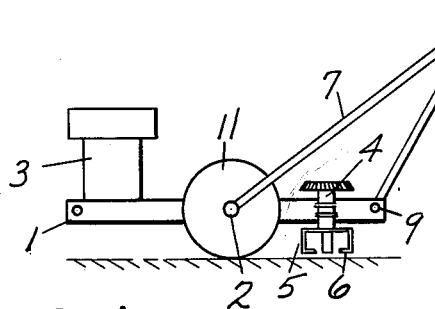
Figure 2:
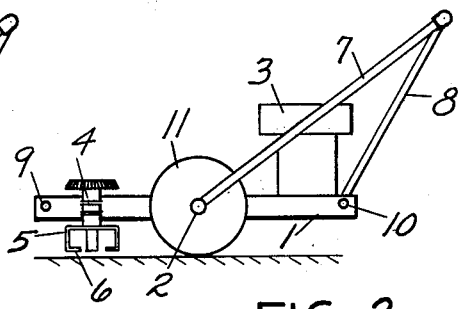
Figure 6:
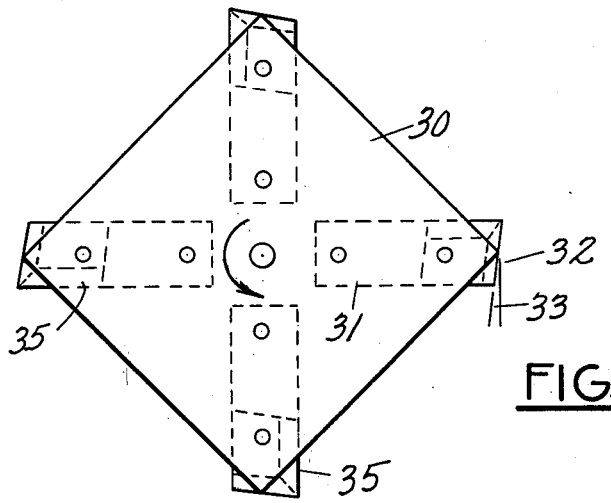
Figure 7:
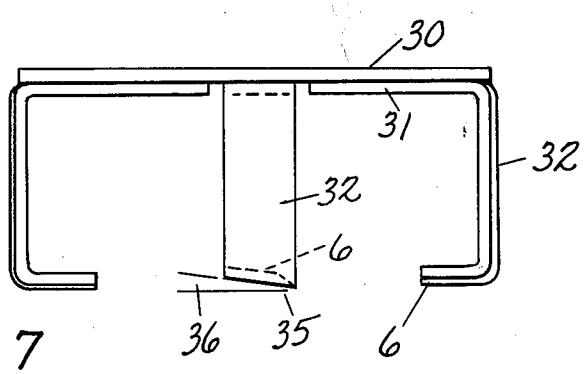
Figure 3:
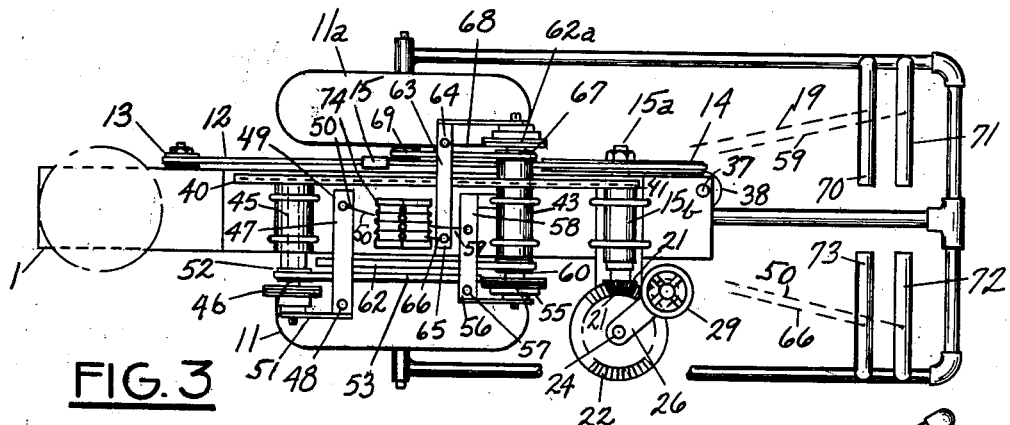
Figure 4:
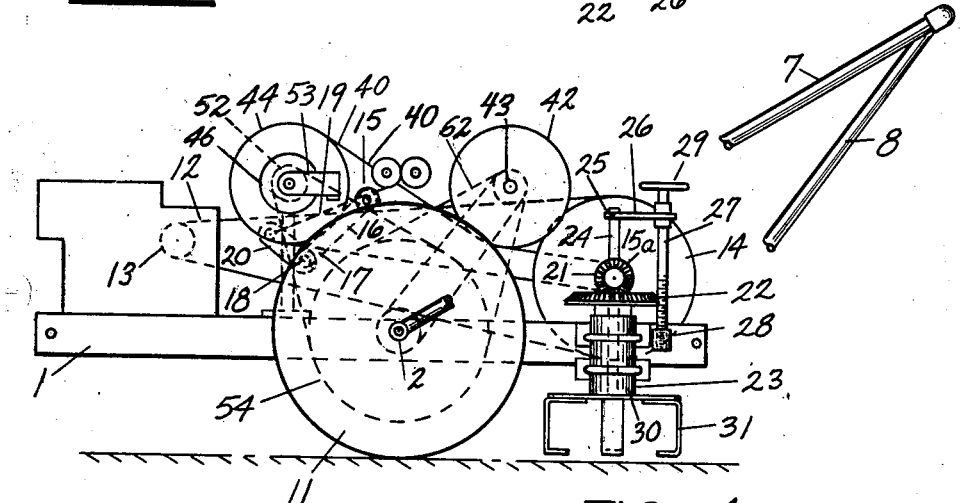
Figures 5, 5A:
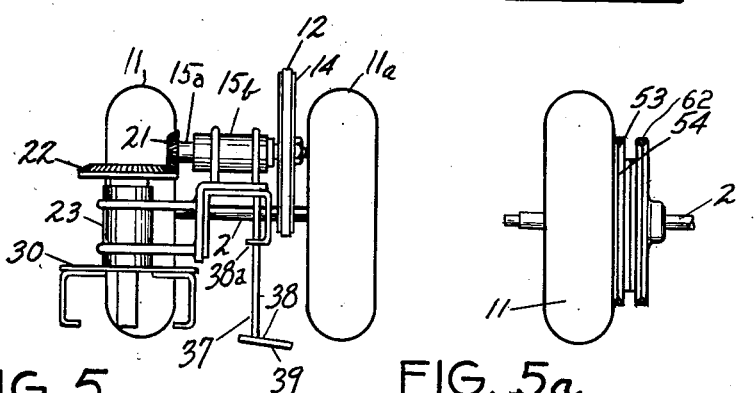

In the drawing, FIG. 1 is a diagrammatic view of the machine in position for hoeing garden plants, FIG. 2 is a diagrammatic view of the machine in position for hoeing around shrubs, FIG. 3 is a top plan view of the machine, FIG. 4 is a side elevation, FIG. 5 is a back view, FIG. 5a is a fragmentary view of the driven wheel and its drive pulleys, FIG. 6 is an enlarged top view of the rotary hoe and FIG. 7 is a side view of the rotary hoe.

As shown in the diagrammatic views, FIGS. 1 and 2, where the driving parts have been omitted for simplicity, the machine has a longitudinal frame 1 with an axle 2 at the center for a pair of wheels 11 and 11a, one on each side of the frame. At one end of the frame is a motor 3. At the opposite end of the frame is a vertical shaft 4 having at its lower end a rotary hoe 5 having horizontal blades 6 which cut through the soil in the same manner as the conventional hoe. The machine is maneuvered by a U-shaped handle having sides 7 pivoted on opposite ends of the axle 2 and having a brace 8 which may be connected either to the point 9 on the frame as shown in FIG. 1 or to the point 10 on the frame as shown in FIG. 2. When the handle is connected as shown in FIG. 1, the machine is in position for hoeing where the hoeing blades 6 are at the rear of the wheel 11. When the handle is connected as shown in FIG. 2, the hoeing blades 6 are in front of the wheel 11. The FIG. 1 position is preferable for hoeing garden crops. The FIG. 2 position is preferable for hoeing shrubs.

The power is transmitted from the motor through a belt 12, a pulley 13 on the motor shaft and a pulley 14 on the horizontal shaft 15a carried in a journal 15b at the end of the frame 1 opposite the motor. The drive is controlled by the usual idler pulley belt tightener 15 carried on arm 16 of a bell crank 17 pivoted at 18. By pulling on a cable 19 attached to the other arm 20 of the bell crank, the idler pulley 15 is swung downward to tighten the belt 12 and start the drive. Upon releasing the cable 19, the bell crank returns the idler pulley to its idling position, stopping the drive.

Fixed on the shaft 15a is a bevel pinion 21 meshing with a bevel gear 22 rotatably carried in a journal 23 fixed to one side of the frame 1. The bevel gear 22 is splined to the vertical shaft 24 having at its upper end a groove 25 receiving one end of a height adjustment arm 26 carried on an adjustment screw 27. The lower end of the adjustment screw is threaded in a nut 28 on the frame 1 and the upper end of the adjustment screw has a knob 29 by which it is turned. As the adjustment screw is turned, the arm 26 is moved up or down and causes a corresponding movement of the vertical shaft 24.

Fixed on the lower end of the vertical shaft 24 is a hub 30 on the under side of which are bolted a plurality of cutting blades 31 as shown in greater detail in FIGS. 6 and 7. The blades have vertical arms 32 which are inclined to the radial, as shown in FIG. 6, to provide a clearance angle 33 which permits the arms to cut through the soil without drag. At the lower end of the arms are the inturned cutting blades 6, the leading edges 35 of which are formed in sharp cutting edges. The bottom surfaces of the blades 6 are relieved to provide a clearance angle 36 which reduces the drag as the blades cut through the soil. It will be noted that the cutting edges 35 extend in a generally radial direction and that there is a substantial open space between the blades and the center of the hub. As the hub rotates, the blades slice through the soil in the same manner as the conventional hoe. This cuts the roots of the weeds and loosens the soil. It also tends to raise the roots of the weeds to the surface. The blades are self clearing and non clogging. The open space at the center eliminates anything about which weeds might wrap or become tangled. Weeds catching on the arms 32 are pulled out and thrown to one side. Weeds contacting the cutting edges 35 are cut below the surface of the soil. In addition to cutting the weeds, the blades also loosen and elevate the soil. The height of the blades is adjusted by the depth adjustment screw 27. Ordinarily the cutting edges of the blades 6 will be from an inch and a half to two inches below the surface of the soil. This depth can be varied in accordance with conditions.

The vertical axis of the cutters is behind and offset slightly to the outside of wheel 11. In use, the machine can be pivoted about wheel 11 first in one direction and then in the opposite direction, swinging the cutter in and out so as to hoe around plants in a row. The offset allows the wheel 11 to come close to the plants without running over them. In a typical machine, the offset is arranged so that the outermost section of the cutting blades 6 projects from four to five inches outside the outermost part of the wheel 11.

With the parts so far described, hoeing can be done at a speed of from 40 to 50 feet of row per minute. The work of hoeing is taken care of by the power driven blades 6. It is only necessary for the operator to push the machine along the ground and to guide it so that the hoeing blades move in and out around the plants in the row. Little effort is required to push the machine.

To prevent the blades from digging into the soil, an adjustable depth gage is provided. This comprises a vertical rod 37, rotatably carried in a bracket 38a, adjustably fixed to the frame 1 opposite the hoeing cutter. At the lower end of the rod is fixed a foot 38 having a downwardly inclined lower surface 39 to keep it from digging into the ground. The foot 38 normally rides on the surface of the soil and in case the machine is stopped, will prevent the cutters from sinking too deep below the surface of the soil. Because the rod 37 is pivoted, as the machine is turned, the foot 38 swings around like a caster and does not hinder any movement. For example, when the machine is going straight forward, the foot will trail behind the rod 37. This would be true of any direction of motion of the machine.

The wheel 11 is driven by a chain drive. A chain 40 runs over a sprocket 41 fixed on the shaft 15a, under a sprocket 42 fixed on a shaft 43 and over a sprocket 44 fixed on a shaft 45. By this drive, the sprockets 42 and 44 turn in opposite directions, thereby permitting either forward or reverse drive as desired.

The forward drive is from the shaft 45 through a clutch 46 controlled by a bell crank clutch control 47 pivoted at 48. One arm 49 of the clutch control is connected to a cable 50. The other arm 51 of the clutch control is connected to the clutch. When the clutch is engaged by pulling on the arm 50, a pulley 52 fixed to the shaft 45 rotates and drive the wheel 11 forward through a belt 53 and pulley 54. Power is applied only to the wheel 11 so that the wheel 11a is free to turn both slower and faster than wheel 11 as may be required. If power were applied to both wheels 11 and 11a, pivoting of the machine about wheel 11 first in one direction and then in the opposite direction would be impossible.

Reverse drive is through the shaft 43 and clutch 55 controlled by a bell crank clutch control lever 56 pivoted at 57. One arm 58 of the clutch control lever 56 is connected to a cable 59. When the cable 59 is pulled to engage the clutch, a reverse drive to the wheel 11 is established through a pulley 60 fixed to the shaft 43 and a belt 62 to a pulley of the same diameter as pulley 54 attached to the wheel 11 beside the pulley 54. The forward speed and the reverse speed drive of the wheel 11 is the same. This would ordinarily be selected at a comfortable speed for hoeing somewhere in the range of from 40 to 60 feet per minute.

When the machine is going to and from the field, the slow speed drive needed for hoeing is not desirable and for this purpose a faster drive is obtained through a clutch 62a on the shaft 43. The clutch 62a is controlled by a clutch control lever 63 pivoted at 64. When one arm 65 of the clutch control lever is pulled by a cable 66, the clutch is engaged and a drive established to the wheel 11a through a pulley 67 on the shaft 43, a belt 68 and a small diameter pulley 69 fixed to the wheel 11a. This higher speed drive is at a comfortable walking speed rather than at the slower hoeing speed. While going to and from the field, the hoeing cutters are, of course, raised.

The controls are mounted on the handle in a position easily accessible to the operator. A pivoted lever 70 controls the idler pulley 15 through cable 19. A pivoted lever 71 controls the reverse drive of the wheel 11 through cable 59. A pivoted lever 72 controls the forward drive of the wheel 11 through cable 50 and a pivoted lever 73 controls the high speed drive to the wheel 11a through cable 66. In each case, the lever is attached to the control cable and the cables go through guide rolls 74 to the respective control levers. Suitable arrangements (not shown) may be provided for holding the levers in driving position or the levers may be manually held in driving position.

What is claimed as new is:

1. A hoeing machine comprising a longitudinal frame, a motor at one end of the frame, a transverse axle supported by the frame between its ends and having a pair of wheels, one on each side of the frame, a drive from the motor to one of the wheels, the other wheel being idle and free to turn so the frame may pivot first in one direction and then in the opposite direction about the driven wheel, a handle connected to opposite ends of the axle and to one end of the frame, a vertical shaft spaced from the driven wheel and mounted on the same side of the frame as the driving wheel, a power drive for the vertical shaft, caster means on the frame providing with the wheels a three point support for the machine, a rotary hoe having a hub concentric with and drivingly connected to the vertical shaft, said hub having vertical depending arms spaced radially from and circumferentially about the axis of the shaft, blades at the lower ends of said arms projecting radially inwardly toward the axis of the hub in a generally horizontal plane, said blades having radially extending cutting edges slicing horizontally through the soil and turning in a circle projecting outside the driven wheel so the wheel does not run over plants as the blades hoe next to the plants, the arms and blades of the hoe being arranged to provide an open space below the hub.

2. A hoeing machine comprising a longitudinal frame, a motor at one end of the frame, a transverse axle supported by the frame between its ends and having a pair of wheels, one on each side of the frame, a drive from the motor to one of the wheels, the other wheel being idle and free to turn so the frame may pivot first in one direction and then in the opposite direction about the driven wheel, a vertical shaft spaced from the driven wheel and mounted on the frame at the end of the frame opposite the motor and on the same side of the frame as the driven wheel, a power drive for the vertical shaft, a rotary hoe having a hub concentric with and drivingly connected to the vertical shaft, said hub having vertical depending arms spaced radially from and circumferentially about the axis of the shaft, blades at the lower ends of said arms projecting radially inwardly toward the axis of the hub in a generally horizontal plane, said blades having radially extending cutting edges slicing horizontally through the soil and turning in a circle projecting outside the driven wheel so the wheel does not run over plants as the blades hoe next to the plants, the arms and blades of the hoe being arranged to provide an open space below the hub.

3. A hoeing machine comprising a frame, an axle supported by the frame, a pair of wheels on the axle, a motor on the frame, two counter shafts mounted on the frame and respectively driven in opposite directions by the motor, a drive from each counter shaft to one of the wheels, each drive including a selectively manually operable clutch, the other wheel being idle and free to turn so the frame may pivot first in one direction and then in the opposite direction about the driven wheel, a vertical shaft spaced from the driven wheel and mounted on the frame on the same side as the driven wheel, a power drive for the vertical shaft, a rotary hoe having a hub concentric with and drivingly connected to the vertical shaft, said hub having vertical depending arms spaced about the axis of the vertical shaft, blades at the lower ends of said arms extending radially inward in a substantially horizontal plane short of the axis of the vertical shaft, said blades having radially extending horizontal cutting edges slicing horizontally through the soil and turning in a circle projecting outside the driven wheel so the wheel does not run over plants as the blades hoe next to the plants.

4. A hoeing machine comprising a frame, an axle supported by the frame, a pair of wheels on the axle, a motor on the frame, two counter shafts mounted on the frame and respectively driven in opposite directions by the motor, a drive from each counter shaft to one of the wheels, each drive including a selectively manually operable clutch, the other wheel being idle and free to turn so the frame may pivot first in one direction and then in the opposite direction about the driven wheel, a vertical shaft spaced from the driven wheel and mounted on the frame on the same side as the driven wheel, a power drive for the vertical shaft, and a rotary hoe having a hub concentric with and drivingly connected to the vertical shaft, said hub having vertical depending arms spaced about the axis of the vertical shaft with blades at the lower ends of said arms projecting radially inwardly toward the axis of the hub in a generally horizontal plane, said blades having radially extending horizontal cutting edges slicing horizontally through the soil and turning in a circle projecting outside the driven wheel so the wheel does not run over plants as the blades hoe next to the plants.

5. A hoeing machine comprising a frame, an axle supported by the frame having a pair of axially spaced wheels, a motor on the frame, two counter shafts mounted on the frame and respectively driven in opposite directions by the motor, a hoeing speed drive from each counter shaft to one of the wheels, a walking speed drive from one of the counter shafts to the other of the wheels, each drive including a selectively manually operable clutch, the other wheel being idle and free to turn so the frame may pivot first in one direction and then in the opposite direction about the driven wheel, a vertical shaft spaced from the driven wheel and mounted on the frame on the same side of the frame as said one wheel, a power drive for the vertical shaft, a rotary hoe having a hub concentric with and drivingly connected to the vertical shaft, said hub having vertical depending arms spaced about the axis of the vertical shaft, blades at the lower ends of said arms extending radially inward short of the axis of the vertical shaft, said blades having radially extending cutting edges slicing horizontally through the soil.

References Cited in the file of this patent

UNITED STATES PATENTS

| | | |
|---|---|---|
| 95,394 | Taplin | Sept. 28, 1869 |
| 1,098,225 | Carroll | May 26, 1914 |
| 1,128,051 | Rose | Feb. 9, 1915 |
| 1,251,553 | Marvin | Jan. 1, 1918 |
| 1,506,042 | Bauer | Aug. 26, 1924 |
| 1,936,135 | Lierman et al. | Nov. 21, 1933 |
| 2,410,273 | Deubner | Oct. 29, 1946 |
| 2,411,544 | Kehl | Nov. 26, 1946 |
| 2,645,300 | Watts et al. | July 14, 1953 |
| 2,791,953 | Erickson et al. | May 14, 1957 |

FOREIGN PATENTS

| | | |
|---|---|---|
| 452,103 | Canada | Oct. 26, 1948 |
| 1,008,235 | France | Feb. 13, 1952 |
| 1,167,288 | France | July 7, 1958 |

OTHER REFERENCES

German Application (Kl. 45a 53-14) 1,056,408, printed April 30, 1959.